United States Patent [19]
Lloyd et al.

[11] 4,133,310
[45] Jan. 9, 1979

[54] POLYMER FABRIC

[75] Inventors: Ronald Lloyd; William O. Murphy, both of Sawbridgeworth; Albert G. Patchell, Welwyn Garden City; Peter J. Herbert, Bishops Stortford, all of England

[73] Assignee: Smith & Nephew Research Limited, Harlow, England

[21] Appl. No.: 627,347

[22] Filed: Oct. 30, 1975

[30] Foreign Application Priority Data

Jan. 11, 1974 [GB] United Kingdom ............... 47403/74
Jan. 11, 1974 [GB] United Kingdom ............... 47416/74

[51] Int. Cl.$^2$ ........................................... A61L 15/00
[52] U.S. Cl. .................................. 128/156; 428/136; 428/156; 428/145; 428/317; 428/343; 428/910
[58] Field of Search ............... 428/156, 167, 169, 317, 428/910, 131, 134, 135, 136, 304, 195, 343; 57/104 R; 28/71.3; 128/156, 159; 156/229, 181; 264/210 R, 210 F, 284, 288, 175, 176 F, 177 F, DIG. 8, DIG. 47, DIG. 62, DIG. 70, DIG. 81; 24/16 R, 16 PB

[56] References Cited

U.S. PATENT DOCUMENTS

| | | | |
|---|---|---|---|
| 3,457,919 | 7/1969 | Harbard | 428/167 |
| 3,682,760 | 8/1972 | Fairbanks | 428/167 |
| 3,906,130 | 9/1975 | Tsurumi et al. | 428/131 |
| 3,922,329 | 11/1975 | Kim et al. | 156/229 |
| 3,950,584 | 4/1976 | Bramley | 264/DIG. 81 |
| 3,969,561 | 7/1976 | Marshall | 428/167 |

Primary Examiner—Stanley S. Silverman
Attorney, Agent, or Firm—Robert F. O'Connell

[57] ABSTRACT

A non-woven fabric is produced by stretching the film with on one surface a regular pattern of raised areas such as spaced hexagonal bosses and on the other surface a plurality of parallel grooves. Stretching is carried out in the groove direction. Preferably the polymer is a mixture of incompatible polymers so that on stretching a fibrous structure is formed. The film can be produced by melt-embossing. The stretched non-woven fabric may be coated with various adhesives to provide a tape useful in a medical context.

6 Claims, 4 Drawing Figures

POLYMER FABRIC

The present invention relates to non-woven fabrics made from polymeric material, and to adhesive tapes made from such fabrics.

Our earlier British Patent Application No. 27637/74 discloses a polymer film having on one surface a plurality of primary parallel ribs and grooves extending in a first direction and on the other surface a plurality of secondary parallel ribs and grooves extending in a second direction intersecting with the first direction at an angle of not less than 30°, the film having been subjected to exclusively or predominantly uniaxial stress in a direction at right angles to the first direction. The film can be readily torn in either of two directions at right angles.

The polymer film may be a blend of two incompatible thermoplastic polymers. When such a film is subjected to uniaxial stretch, splits occur at the transverse grooves to form bands which fibrillate and a net is formed.

The present invention may be regarded, at least in some of its forms, as a modification of the invention disclosed in Application No. 27637/74.

The present invention provides a method of producing a non-woven fabric, comprising: providing a film of polymer material, the film having formed on one side a regular pattern of raised areas and on the other side a plurality of parallel grooves; and stretching the film exclusively or predominantly in the direction of the grooves.

In this specification by "predominantly", in relation to the stretching of a film in one direction, we mean that the degree of stretching of the film in a direction normal to the groove direction does not exceed 50%.

Preferably the raised areas are in the form of spaced bosses. These may be square, round, octagonal or other polygonal shape but are most preferably regularly hexagonal. The centres of the bosses can be arranged on a square or hexagonal pattern.

The grooves are preferably arranged relative to such bosses so that, when the film is viewed in plan, at least some of the grooves extend between pairs of adjacent bosses. Preferably the number of grooves per unit length measured along a line extending in the direction at right angles to the grooves should be an integral multiple of the number of bosses per unit length measured along the same line. Such an arrangement provides good tear of the resulting fabric in the groove direction. We also believe that such an arrangement may improve the conformability and flexibility of the resulting fabric in the direction normal to the grooves and possibly also may improve the conformability and flexibility of the resulting fabric in the direction of the grooves.

Preferably the degree of stretch in the groove direction is 50 to 250%. A degree of stretch of 100 to 200% will often be suitable. The degree of stretching of the fabric in the groove direction will depend to some extent on the intended use of the fabric. Thus, if the intended use of the fabric is in surgical tape, it is envisaged that a suitable degree of stretch of the fabric in the groove direction will be from 90% to 125%. If the intended use of the tape is for surgical dressings, it is envisaged that a degree of stretch of the fabric in the groove direction will be from 75% to 150%.

In general, we have found that a relatively high degree of stretch of the film in the groove direction gives a fabric with a better tear in the direction of stretch but a lower value of elongation at break than a relatively low degree of stretch.

The polymer material may be a single polymer or may be a mixture of two or more incompatible thermoplastic polymers. If the polymer material is not a mixture of two or more incompatible polymers, the stretching of the film in the groove direction causes strands to be formed interconnecting the raised areas. If the polymer material is a mixture of two or more incompatible polymers, the stretching of the film in the groove direction causes fibrous areas to be formed interconnecting the raised areas.

Preferably the blend comprises 5 to 95% (more preferably 10 to 90%) of each of at least two incompatible thermoplastic polymers.

The polymer material of which the film is made may comprise high density polyethylene, polypropylene, ethylene propylene copolymer or polyamide. If it is a blend of two or more incompatible polymers, this may comprise high density polyethylene, polypropylene, or an ethylene propylene copolymer as its major component and polystyrene or polyamide as a minor component.

The film used in carrying out the invention can be made by any method but is preferably produced by melt-embossing. For example, the film may be produced by passing a molten polymer film through a nip between a first roller having grooves on its circumferential surface and a second roller having a pattern of cavities on its circumferential surface. The first, i.e. grooved, roller forms grooves on one side of the film and the second roller forms bosses on the other side of the film.

The fabrics produced by the methods of the invention have certain common characteristics. They are permeable to gases and liquids, they have good tear in the groove direction and they have good conformability and good stretchability. By "good conformability" we mean that the fabrics, when applied to a surface which is (or becomes) irregularly shaped, readily adapt themselves to the shape of the surface provided that they remain under tension. This good conformability is believed to be due to the fact that the fabric can stretch both in the groove direction and normal to the groove direction. The fabric can stretch in the groove direction because the strands or fibrous areas interconnecting the raised areas can stretch. The fabric can stretch in the direction at right angles by stretching those membranes formed between the raised areas spaced apart in the direction at right angles. If the fabric is made from a blend of at least two incompatible polymers, the stretching of the film in the direction at right angles causes the membranes to fibrillate to form additional fibrous areas interconnecting the raised areas.

Uses envisaged for fabrics produced in accordance with the invention include use in strapping and packaging and as backing for surgical strapping tape.

In a further aspect the invention provides a non-woven fabric made of thermoplastic polymer material and comprising raised solid non-fibrous areas interconnected by fibrous areas, the fibres in the fibrous areas being predominantly oriented in one direction or at an angle not greater than 45° to said one direction, the fabric having good tear at least in said one direction. Such fabric may be made by a method according to the invention. By "good tear", we mean a tear of less than 100 measured by the Elmendorf method.

The raised areas are preferably rows of interconnected bosses, the rows being interconnected by fibrous areas, the bosses in each row being interconnected by non-fibrous membranes or by additional fibrous areas.

In a yet further aspect the invention provides a non-woven fabric made of thermoplastic polymer material and comprising solid non-fibrous areas and fibrous areas, the fibrous areas being integral and merging into the non-fibrous areas so that there are no distinct interfaces on a molecular level between the fibrous and non-fibrous areas, the fibres in each fibrous area being oriented between adjacent non-fibrous areas, the direction of orientation of the fibres in each fibrous area varying dependent upon the shape and size and relative disposition of the non-fibrous areas.

The relative disposition of the non-fibrous areas may depend upon their original disposition, e.g. as embossments in an embossed sheet from which the fabric is made and the subsequent treatment of the sheet, e.g. stretching and/or stressing the sheet to create the fibrous areas.

There may be holes in the fabric, the holes being defined partially or wholly by the fibrous areas.

The fabric preferably comprises an incompatible blend of thermoplastic polymers in which case the size, definition and density of the fibres in the fibrous areas will depend to some extent on the degree of polymer mixing and orientation in the local regions. With good mixing and high orientation it is possible to produce dense masses of fibres in the fibrous areas some of which fibres may be as fine as 0.1 micron. However, producing fibres in the fibrous regions may be produced by other means, e.g. by the use of sheets containing fillers, such as polypropylene films containing kaolin clay.

The fabric may have one or a combination of properties such as good conformability, good stretch and good drape, and low tear strength in at least one direction.

In some cases the non-fibrous areas may be converted to additional fibrous areas by subsequent treatment such as brushing. The additional fibrous areas may have different characteristics to the original fibrous areas.

Another aspect of the present invention consists in the non-woven fabric produced as described above having on at least one surface thereof a physiologically acceptable gas-permeable and watervapour-permeable adhesive layer.

An advantage of the adhesive sheets in accordance with the invention is that the adhesive does not penetrate through the fabric during coating, e.g. it stays on the side to which it is applied.

The adhesive layer may be in the form of a continuous or discontinuous layer.

If the adhesive is in the form of a continuous layer the adhesive itself must be gas-permeable. If the adhesive is in the form of a discontinuous layer, the adhesive itself need not be gas-permeable because the discontinuities make the layer gas-permeable.

If the adhesive layer is in the form of a continuous layer, it is preferred that the adhesive is a polyacrylate adhesive or a polyvinyl-ethyl ether blend adhesive.

An adhesive sheet according to the invention preferable has adhesive on one side only of the fabric. A sheet having adhesive on both sides of the fabric may be used for attached medical appliances to the skin or for joining two or more porous sheets to form a laminate that is also porous. Such a laminate may be used for example in clothing.

Adhesives for the sheets of the present invention are preferably pressure-sensitive adhesives. However, adhesives of other kinds may be used, for example solvent responsive or heat sealing adhesives.

An acrylic resin may be used as the pressure sensitive adhesive, particularly when the sheet is to be used for medical purposes. Acrylic resins have reduced skin sensitisation properties compared with, for example, rubber adhesives; also aqueous acrylic adhesives have a high MVP when spread as a continuous film.

If a rubber-based pressure-sensitive adhesive is to be used then the backing should first have a tie-coat or primer coat applied to it. Acrylic/rubber emulsions are examples of suitable tie-coats. If high density polyethylene, the preferred material, is to be used it should usually have a surface treatment, for example by corona discharge, on the surfaces that are to be coated with adhesive.

The adhesive may be applied to the backing using conventional methods. For example, to produce a double-sided tape the backing may be run through a solution or emulsion of the adhesive then dried. Alternatively the adhesive may be applied to one side of the backing, which is then protected with a removable liner while adhesive is applied to the other side.

Sheets with adhesive on one side may be obtained simply by coating only the required side with adhesive for example, with a roller. Also, other known coating methods such as transfer coating, "tramline" coating and pattern coating, may be used.

After their manufacture sheets according to the present invention may be cut to the required size then wound onto cores ready for use. To permit winding onto cores the sheets with adhesive on both sides require a removable liner on one side. Tapes with adhesive on one side may have the other side coated with a release coating.

The adhesive sheets of the invention may be used as surgical tape, first aid dressings and wound dressings.

Adhesive sheets in accordance with the invention may have other uses, e.g. for decorative purposes and in packaging. In such cases any adhesive, even if not physiologically acceptable may be used and the adhesive layer need not be gas-permeable and watervapour-permeable.

The invention will be further described below with reference to the accompanying drawings, in which.

Figure 1:
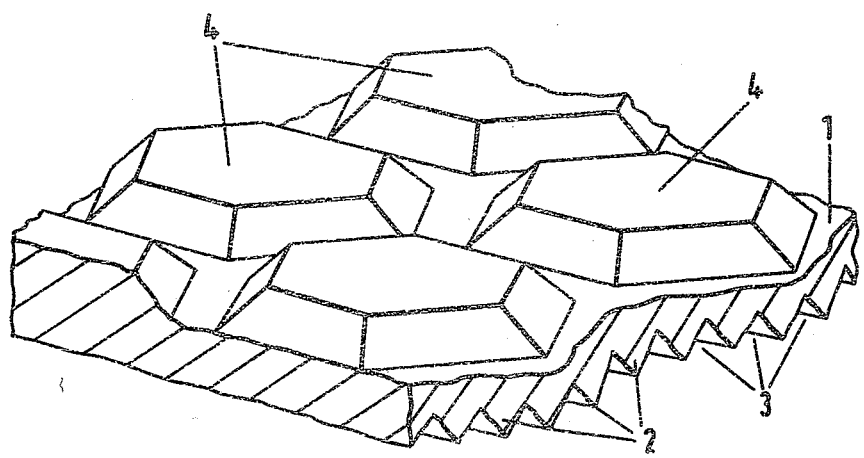
FIG. 1 is a diagrammatic perspective view of a piece of film for use in producing a fabric according to the invention.
Figure 2:
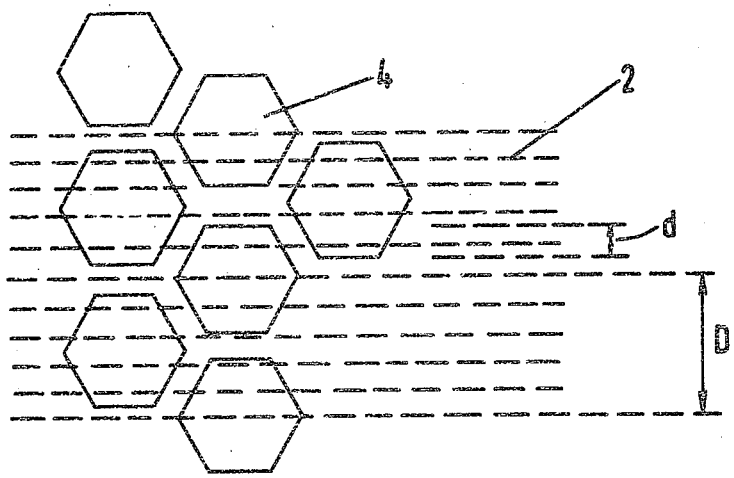
FIG. 2 is a diagrammatic plan view of the film shown in FIG. 1.

Referring to FIGS. 1 and 2, a polymer film 1 has formed on one side (its upper side in the drawings) a pattern of raised bosses 4, only some of which are shown, arranged in rows and on the other side a plurality of parallel ribs 2 and grooves 3 extending in a direction at right angles to the rows of bosses, the crests of the ribs being indicated by broken lines in FIG. 2.

Each boss has sloping sides and has, when viewed from above, the shape of a regular hexagon. (Alternatively the bosses could be of some other shape, e.g.

square.) The top of each boss may be flat or rounded or may have a depression formed in it, as a consequence of the embossing process.

As seen in FIGS. 1 and 2, the spacing between adjacent bosses of each row (as measured between the centres of the bosses) is greater than the spacing between adjacent grooves, as measured between the centres of the bottoms of each groove. In the example of FIG. 2, the spacing D between centres of adjacent bosses of each row is five times the spacing between adjacent grooves.

The grooves 3 may have flat or rounded bottoms or bottoms formed by the sides of the grooves meeting at an angle along a line as shown in FIG. 1. Similarly they may have flat or rounded crests or crests formed by the flanks of the ribs (which are the same as the sides of the grooves) meeting at an angle along a line as shown in FIG. 1.

The number of grooves per inch may be in the range of 50 to 500, for example 250. The number of bosses per inch in each row may be in the range of 100 to 10, for example 50. The number of grooves per inch may be in the range of 2 to 20 times the number of bosses in each row per inch.

The height of the ribs may be in the range of 0.5 thou to 8 thou. The height of the bosses may be in the range of 2 thou to 25 thou. (By "thou" we mean one-thousandth of an inch, i.e. 25 microns).

It will be appreciated that the thinnest portions of the film occur where the bottoms of the grooves on one side of the film cross the regions between the bosses on the other side of the film. We refer to such portions of the film as "membranes". The thickness of the membranes may be in the range of from 10 microns to 200 microns.

Figure 3:
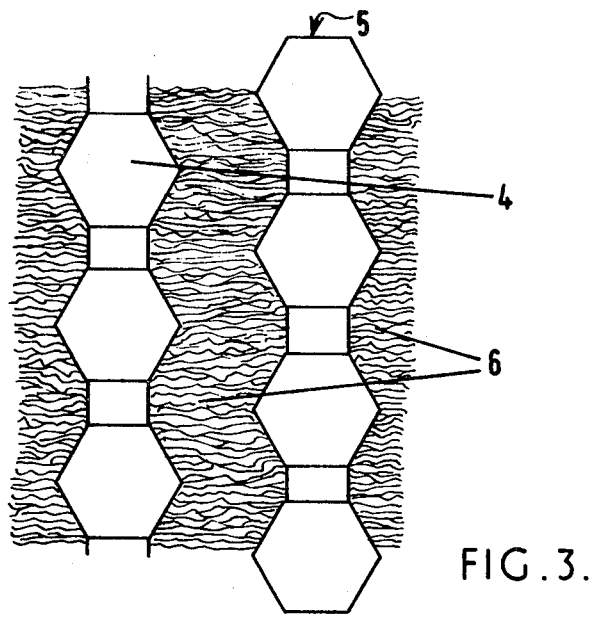
FIG. 3 is a plan view of a fabric formed by stretching a film as shown in FIGS. 1 and 2 in the direction of its grooves.

If the film of FIGS. 1 and 2 is made of a blend of at least two incompatible thermoplastic polymers, when exclusively or predominantly stretched in the direction of the ribs and grooves, it produces a fabric as shown in FIG. 3. In the fabric, relatively thick solid fibres 5 each formed from a row of the bosses 4 are joined by elongate fibrous areas consisting of fibrous bands 6 interconnecting the fibres 5, the fibrous bands merging into each other. The degree of stretching is preferably as discussed above.

The fibrous bands 6 consist of fibres predominantly oriented in the direction in which the film was stretched or in directions approximating to the direction in which the film was stretched and tending to be oriented between opposed faces of bosses in adjacent rows. Thus most of the fibres are oriented within 30° of the direction in which the film was stretched.

Figure 4:
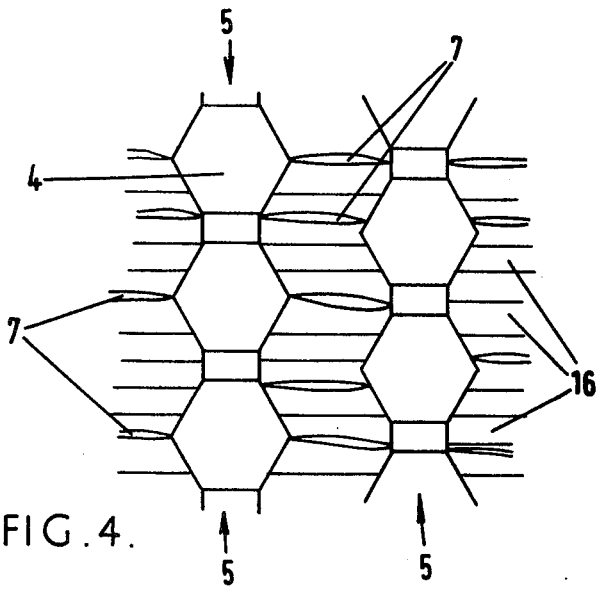
FIG. 4 is a plan view of another fabric formed by stretching a film as shown in FIGS. 1 and 2 in the direction of its grooves.

If the film of FIGS. 1 and 2 is made of a single thermoplastic polymer or a blend of compatible thermoplastic polymers, when stretched exclusively or predominantly in the direction of the ribs or grooves, it provides a fabric as shown in FIG. 4. In the fabric shown in FIG. 4, relatively thick solid fibres 5 each formed from a row of the bosses 4 are joined by discrete strands 16 many or most of which are joined along their lengths to adjacent strands 16. Between some of the strands 16 however, there are thin elongate openings or cracks 7. The cracks 7 are particularly likely to extend from points at or adjacent apices of the bosses 4 of any row 5 of bosses, which apices are directed towards an adjacent row of the bosses. The strands 16 are oriented in the direction in which the film was stretched (or in directions approximating to the direction in which the film was stretched) and generally within 30° of the direction in which the film was stretched.

The fabrics shown in FIGS. 3 and 4 have the properties of being porous, having good conformability, being easily tearable in the direction parallel to the fibrous bands 6 or fibres 16, i.e. the direction of the grooves, (if originally present on the film) and having excellent stretch characteristics.

The film of FIGS. 1 and 2 may be split in the direction at right angles to the grooves to form tapes, before being stretched in the groove direction to form the fabric. Alternatively, the film may be stretched to form the fabric and then split into tapes.

The fabrics of FIGS. 3 and 4 may be stretched in the direction parallel to the fibres 5, i.e. the direction at right angles to the direction of the grooves. Such stretching causes the portions or membranes 8 between the bosses to elongate in the direction of stretch and to form fibrous areas or masses and results in formation of an open net.

The invention will be further described in the following Examples.

EXAMPLE 1

A polymer film was prepared from a blend of 100 parts by weight of Vestolen A6016 (Huls), a high density medically approved polyethylene, and 20 parts by weight of high impact polystyrene (Coles 6MW). The film was melt embossed by being passed in a molten state through a nip between two rollers, one roller having 250 axial grooves per inch on its circumferential surface and the other roller having a pattern of hexagonal cavities, the pattern corresponding to the pattern of bosses shown in FIGS. 1 and 2, the cavities being arranged in rows each having 50 cavities per inch. The resulting melt embossed film was like that shown in FIGS. 1 and 2 and had a thickness of 0.005 inches and a weight of 72 g/m². The film was then stretched in the transverse direction only, i.e. the direction of the grooves, by 110% to form a fabric. Thus the final width of the fabric was 210% of the original width of the film. Tapes cut from the fabric had properties given in the Table (mean values are given).

EXAMPLE 2

Example 1 was repeated except that the film was transversely stretched by only 100%. The resulting fabric had properties given in the Table.

EXAMPLE 3

Example 2 was repeated except that the film consisted of high density polyethylene. The resulting fabric had properties given in the Table.

TABLE

|  | Example 1 | Example 2 | Example 3 |
|---|---|---|---|
| Weight | 41 | 44 | 45 |
| Degree of stretch (%) | 110 | 100 | 100 |
| Tensile strength (kgf/cm) in machine direction | 1.10 0.72 | 0.76 | 0.61 |
| Tensile strength (kgf/cm) in transverse direction |  | 1.16 | 1.4 |
| % elongation at break in machine direction | 75 100 | 110 | 94.9 |
| % elongation at break in transverse direction |  | 80.7 | 94.2 |
| Tear strength (g) in machine direction | 32 | 15.4 | 22 |
| Tear strength (g) in transverse direction | 30 | 20.4 | 15.8 |
| Flexural rigidity (mg/cm) in machine direction | 40 14 | 45 | 155 |

TABLE-continued

|  | Example 1 | Example 2 | Example 3 |
|---|---|---|---|
| Flexural rigidity (mg/cm) in transverse direction |  | 46 | 77 |
| Number of bosses per inch in transverse direction | 33 | 36 |  |

Notes:
(1) Flexural rigidity was determined using a "Shirley" stiffness tester, a fixed angle flexometer for fabrics. The results given are based on determination of bending lengths for three specimens.
(2) Tear strength was determined by a special method based on rotating drum to simulate finger tear test. Results represent average load to tear through 5 cm of tape.

EXAMPLE 4

Evaluation of Surgical Strapping Tape based on Fabric of Example 1

The fabric produced in Example 1 was converted into adhesive tape by coating with an emulsion based adhesive. The adhesive used was N.580 (Rohm and Haas), thickened with Collarcryl VL. This adhesive was chosen to give adequate adhesion to the fabric together with an acceptable unspooling tension. The fabric was "Corona" discharge treated before spreading to give improved keying of the adhesive to the fabric.

The coating of the adhesive was carried out as follows.

The fabric was "Corona" discharge treated on the smooth side (i.e. the side remote from the bosses). Adhesive N.580 is coated on to a release coated paper and then fully dried before laminating to the "Corona" - discharge treated fabric. Lamination is carried out at 40 p.s.i./60° C. The adhesive spread fabric is then delaminated from the paper and self wound to 10 meter lengths on polypropylene cores. Tapes are then lathe cut as required from these sticks.

N.580 is thickened with Corralcryl VL to give the required coating viscosity. The adhesive is spread to give a dry coating weight of 38–42 g.s.m.

The tapes were tested and the test results are given below.

| | |
|---|---|
| Base weight (gsm) | 42–46 |
| Adhesive weight (gsm) | 39–41 |
| Tape weight (gsm) | 81–87 |
| Gauge (inch) | 0.0062±0.002 |
| Tensile strength (kgf/cm) | 0.79±0.09 |
| Elongation at break | 123±15 |
| Elmendorf tear (g/strip) | 34±1 |
| Adhesive to steel (gf/cm) | 128±6 |
| Adhesive to self (gf/cm) | 52±1 |
| European pharmacopoeia test for adhesive (a) | No slippage |
| Unspooling tension (gf/cm at 50 ft/min) | 72–132 |
| M.V.P.(g/sq.M/24 hrs/40° C at 100–20 R.H.) | 706±50 |

Tear strength was determined using an Instron tester. The test is based on trouser-leg tear of 8 inches of net extended at 10"/min. The mean load to tear through the specimen is estimated from a graph.

We claim:

1. A non-woven fabric made of thermoplastic polymer material and comprising a plurality of parallel chain-like structures each having raised bosses spaced along its length, said bosses being interconnected by a non-fibrous membrane or by a fibrillated area comprising a multitude of fibers, the said structures being themselves interconnected by further distinct fibrillated areas comprising a multitude of fibers, the fibers in these said further areas being predominantly oriented in one direction or at an angle not greater than 45° to said one direction, the fabric having good tear at least in said one direction.

2. A non-woven fabric in accordance with claim 1 wherein said further fibrillated areas are integral and merge into said bosses so that there are no distinct interfaces on a molecular level between said further fibrillated areas and said bosses, the fibres in each said further fibrillated area being oriented between adjacent bosses, the direction of orientation of the fibres in each further fibrillated area varying dependent upon the shape and size and relative disposition of said bosses.

3. A non-woven fabric as claimed in claim 1 in the form of a tape having on one surface thereof a physiologically acceptable gas-permeable and watervapour-permeable adhesive layer chosen from the group consisting of polyacrylate adhesives and polyvinyl ethyl ether adhesives.

4. A non-woven fabric provided with an adhesive layer as claimed in claim 3 in which the adhesive layer is a continuous layer of gas-permeable adhesive.

5. A non-woven fabric provided with an adhesive layer as claimed in claim 3 in which the adhesive layer is discontinuous and gas-permeable by virtue of the discontinuities.

6. A first aid dressing comprising tape as claimed in claim 3.

* * * * *